(12) United States Patent
Nordbruch

(10) Patent No.: US 10,509,405 B2
(45) Date of Patent: Dec. 17, 2019

(54) CLEARANCE OF AN AUTONOMOUS PARKING SYSTEM

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/564,695

(22) PCT Filed: Apr. 13, 2016

(86) PCT No.: PCT/EP2016/058063
§ 371 (c)(1),
(2) Date: Oct. 5, 2017

(87) PCT Pub. No.: WO2016/173837
PCT Pub. Date: Nov. 3, 2016

(65) Prior Publication Data
US 2018/0107220 A1   Apr. 19, 2018

(30) Foreign Application Priority Data
Apr. 30, 2015 (DE) .......................... 10 2015 208 062

(51) Int. Cl.
*G05D 1/02* (2006.01)
*B62D 15/02* (2006.01)

(52) U.S. Cl.
CPC .......... *G05D 1/021* (2013.01); *B62D 15/0285* (2013.01); *B60Y 2300/06* (2013.01)

(58) Field of Classification Search
CPC ................................................. B60Y 2300/06
See application file for complete search history.

(56) References Cited

U.S. PATENT DOCUMENTS

| 8,755,965 | B1 * | 6/2014 | McClintic | G05D 1/0016 |
| | | | | 701/23 |
| 2010/0156672 | A1 * | 6/2010 | Yoo | G08G 1/14 |
| | | | | 340/932.2 |
| 2012/0188100 | A1 * | 7/2012 | Min | G08G 1/143 |
| | | | | 340/932.2 |

(Continued)

FOREIGN PATENT DOCUMENTS

| DE | 102008021154 A1 | 10/2009 |
| DE | 102015202466 A1 | 8/2016 |

(Continued)

OTHER PUBLICATIONS

International Search Report dated Jun. 24, 2016, of the corresponding International Application PCT/EP2016/058063 filed Apr. 13, 2016.

*Primary Examiner* — Imran K Mustafa
(74) *Attorney, Agent, or Firm* — Norton Rose Fulbright US LLP; Gerard Messina

(57) ABSTRACT

A parking system includes a parking lot having a plurality of parking spaces for parking motor vehicles. In the parking system, a motor vehicle is able to be controlled in an autonomous manner on a route between a parking area and one of the parking spaces. A verification method for the parking system includes steps of the autonomous travel of the route by a test vehicle, determining whether the travel of the route is taking place correctly, and clearing the parking system for use by vehicles that correspond to the vehicle type of the test vehicle.

11 Claims, 1 Drawing Sheet

(56) References Cited

U.S. PATENT DOCUMENTS

2014/0292541 A1    10/2014  Korman
2016/0280370 A1*   9/2016   Canavor ............... B64C 39/024

FOREIGN PATENT DOCUMENTS

| JP | 2011054116 A  | 3/2011 |
| JP | 2015074321 A  | 4/2015 |
| JP | 2015075899 A  | 4/2015 |
| KR | 20150038776 A | 4/2015 |

* cited by examiner

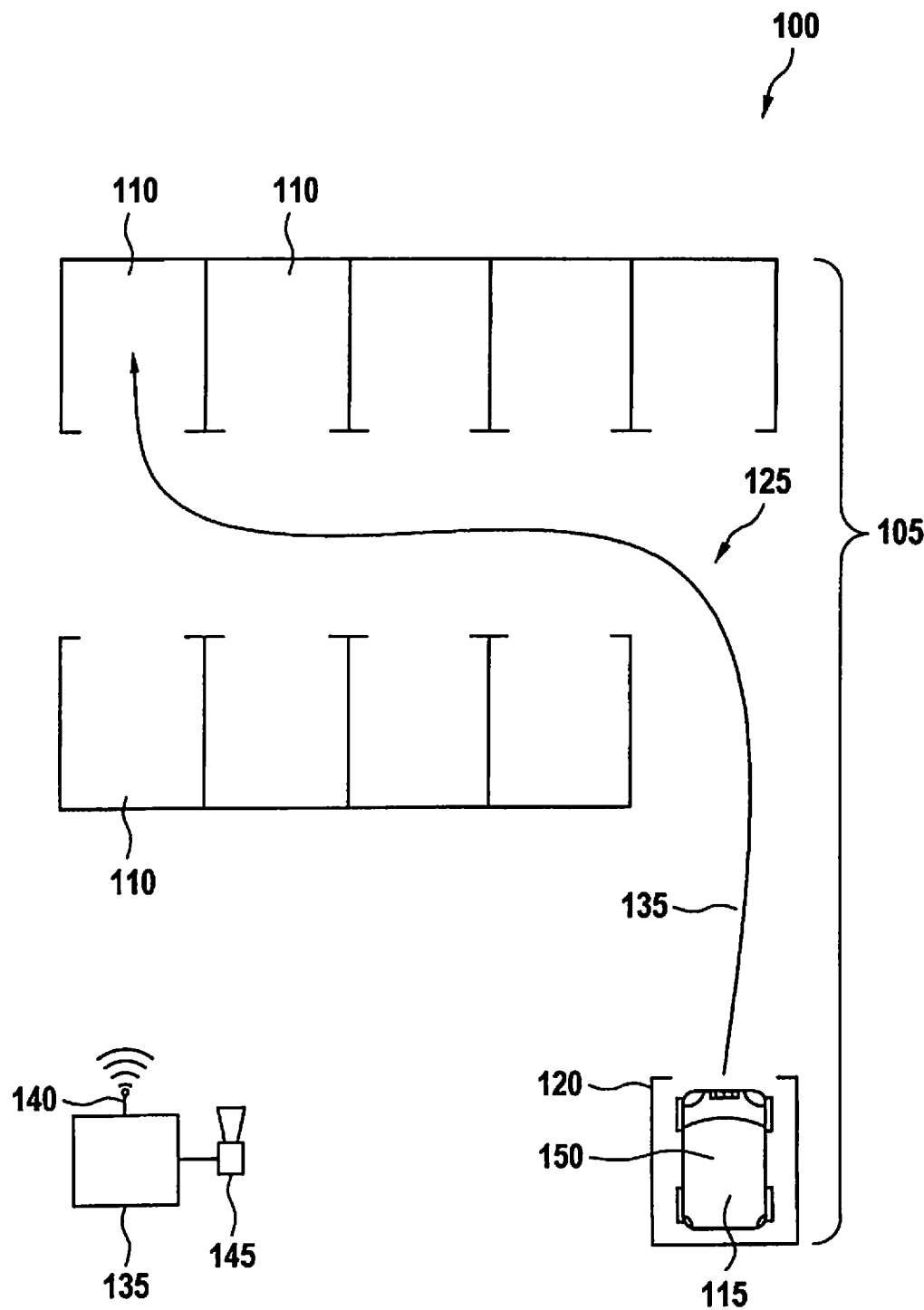

CLEARANCE OF AN AUTONOMOUS PARKING SYSTEM

FIELD

The present invention relates to an autonomous parking system. More specifically, the present invention relates to the verification of the operating reliability of the autonomous parking system.

BACKGROUND INFORMATION

A parking system includes a parking lot having a plurality of parking spaces for parking motor vehicles; in the parking system, a motor vehicle is able to be autonomously controlled on a route between a parking area and one of the parking spaces. Such a process is automated valet parking (AVP). If a motor vehicle is to be parked in the parking lot, then it suffices if the driver takes the motor vehicle to the parking area and leaves it there. The motor vehicle then drives autonomously to one of the parking spaces assigned to it by an administration system, for instance. If the motor vehicle is to be picked up again, then it is able to autonomously drive in the opposite direction, from the parking space to the parking area, where the driver gets in and then controls the vehicle in the usual manner outside the parking lot.

Although different approaches exist for the cooperation between vehicle-internal and vehicle-external systems while traveling the route, the pairing of the motor vehicle and the parking lot may be disadvantageous, so that the route is unable to be driven in an optimal manner, or cannot be driven in full or without a collision. Complicating matters further is that such an incompatibility may also arise after the route has been driven successfully, e.g., when a structural change has been made to the parking lot or to the motor vehicle or when there is a change in the interaction between vehicle-internal and off-board systems.

Therefore, it is an object of the present invention to provide a technique that allows for a more optimal check of an AVP parking system. Preferred specific embodiments of the present invention are described herein.

SUMMARY

In accordance with the present invention, a parking system includes a parking lot having a plurality of parking spaces for parking motor vehicles; in the parking system, a motor vehicle is able to be controlled on a route between a parking area and one of the parking spaces in an autonomous manner. A verification method for the parking system includes steps of autonomously driving the route with a test vehicle, determining that the route is driven correctly, and clearing the parking system for use by vehicles that match the vehicle type of the test vehicle.

On the one hand, this makes it possible to grant a clearance to the motor vehicle and on the other, an already granted clearance is able to be verified. If problems arise while driving the route, then the clearance may be rescinded or suspended for the specific type of vehicle. Damage to this vehicle type by another motor vehicle when using the parking system is able to be avoided in this manner.

The test vehicle preferably drives a plurality of routes, each running between the parking area and a parking space. The more routes in the parking lot that are driven, the greater the certainty that another motor vehicle of the same vehicle type as the test vehicle will be able to drive in the parking lot without any problems. A clearance of the parking system for the corresponding vehicle type may therefore offer greater safety.

In one specific embodiment, a representative sample of routes from a set of possible routes between all parking areas and the parking spaces is driven. The sample may be determined statistically, e.g., randomly, or on the basis of heuristics.

In a still further specific embodiment, sufficient routes between parking spaces and the parking area are traveled until all traffic areas of the parking lot have been covered. Optionally, one or a plurality of parking or unparking operation(s) may be carried out using different parking spaces. In this way the parking lot is able to be checked for usability by a particular vehicle type in a more rapid manner than when driving each route between each parking space and the parking area at least once. Here, for example, the fact that adjacent parking spaces have allocated routes that generally differ only negligibly is exploited. In many cases it is sufficient to drive a route to a parking space that is situated far away in order to thereby simultaneously drive the routes to all parking spaces that lie along the initially mentioned route.

In one specific embodiment, a location in the parking lot where the travel of the route is not taking place correctly is determined within the framework of driving. The parking system may then carry out remedial repairs in the area of the location in order to make the parking lot usable for motor vehicles of the vehicle type of the test vehicle. If the method is employed for reviewing an already existing clearance, then a location where a retroactive structural change took place that may affect the interaction between parking lot and motor vehicle is able to be identified in the described manner. More specifically, it is thereby possible to identify structural changes that were realized, unintentionally or unnoticeably, by a person in charge.

It is especially preferred that the route is traveled by a plurality of different test vehicles. Two or more of the test vehicle(s) may be driving in the parking lot autonomously at the same time. This allows for a more rapid or efficient clearance of the parking system for motor vehicles of different vehicle types.

In a particularly preferred specific embodiment, at least two of the test vehicles include one or more control system(s) in each case and differ only by versions of the control programs of the control systems. This makes it possible to check the compatibility of the parking system with vehicle types that are unable to be distinguished with the naked eye. In this manner, the fact that control programs of control systems on board the motor vehicle may also be updated without the knowledge of an owner or user and may thereby affect other control programs or control systems on board the motor vehicle is able to be taken into account. The type of autonomous control of the motor vehicle might be changed as a consequence, so that an incompatibility with the parking lot could arise as a result of the updating.

In different specific embodiments, an evaluation of the travel by the test vehicle may take place immediately, or it may be carried out only at the conclusion of the test drive. In the first variant, results of the evaluation may be available immediately and used for a modified or repeated test drive as the case may be. In the second variant, the evaluation may be more comprehensive, and thus more protracted, without thereby interfering with the test operation or without prolonging the test operation.

A computer program product includes program code for carrying out the described method when the computer program product is running on a processing device or is stored on a computer-readable data carrier.

A test vehicle for carrying out the afore-described method is developed to drive the route using different versions of the control programs. This may reduce the number of required test vehicles for clearing the parking system. For this purpose, the test vehicle may be designed to appropriately adapt the versions of its control programs during sequential test drives. It is even possible to operate multiple control programs in different versions in parallel in order to simultaneously test multiple versions within the framework of only a single test drive.

In general, it is preferred that the test vehicle includes additional sensors and/or documentation systems for tracking a test drive in comparison with a motor vehicle of the same type that usually occupies the region of the parking system.

The present invention is described in greater detail below with reference to the FIGURE.

BRIEF DESCRIPTION OF THE DRAWING

FIG. 1 shows a schematic representation of a parking system.

DETAILED DESCRIPTION OF EXAMPLE EMBODIMENTS

FIG. 1 schematically illustrates a parking system 100, which includes a parking lot 105 that encompasses a plurality of parking spaces 110 for parking a motor vehicle 115 in each case. In addition, parking system 100 includes a parking area 120, where a motor vehicle 115, under the control of the driver, is able to be dropped off or picked up by a driver. A traffic area 125, open to motor vehicle 115 for driving, is provided between parking area 120 and parking spaces 110. A route 135 leads from parking area 120 to one of parking spaces 110 or in the opposite direction.

Parking system 100 is designed for automated valet parking (AVP). For this purpose, a driver may leave his motor vehicle 115 in parking area 120, where motor vehicle 115 is autonomously controlled along route 135 to a predefined parking space 110. If the driver wishes to pick motor vehicle 115 up again at a later point in time, then motor vehicle 115 will be autonomously guided from parking space 110 along a corresponding route 135 back to parking area 120, where the driver is able to take possession of motor vehicle 115.

Different procedures are available for the autonomous guidance of motor vehicle 115 along route 135. In a first specific embodiment, a control device 135, which is part of parking system 100 and fixed in place outside of motor vehicle 115, controls motor vehicle 115. For example, control device 135 may have a wireless interface 140, by which it makes contact with motor vehicle 115. One or more scanning device(s) 145 such as a camera, a light barrier, a distance meter or some other device may be provided to monitor motor vehicle 115.

In a second specific embodiment, motor vehicle 115 drives on the basis of information it receives from control device 135, control device 135 actively supporting the driving progress of motor vehicle 115 along route 135. This specific embodiment is also referred to as a cooperative infrastructure.

In a third specific embodiment, motor vehicle 115 drives exclusively on the basis of predefined data, e.g. a floor plan of parking lot 105 and a position of a parking space 110 to be headed for.

Regardless of the aforementioned specific embodiments for the autonomous control of a motor vehicle 115 on a route 135 in a parking lot 105 of a parking system 110, quite generally it is to be ensured that no hazard is lurking along route 135 during the autonomous travel of motor vehicle 115. For this purpose, the interaction between a particular vehicle type of motor vehicle 115 and a specific parking system 100 is usually checked. If all tests have a satisfactory result, then a clearance for the use of parking system 100 by a motor vehicle 115 of the tested vehicle may be granted. A list of cleared vehicle types has multiple entries as a rule. The clearance is usually granted after parking system 100 has been built and prior to its general use.

If a structural change is made within the framework of parking system 100, for instance the addition or removal of a parking space 110, the modification of a control program of an infrastructure device, such as a variable message sign, a barrier or a traffic light, or if the configuration of a motor vehicle 115 for which a clearance already exists is modified, then the autonomous travel of parking system 100 by vehicle 115 may be interrupted. Therefore, it is proposed that the clearance be verified in an event-controlled or time-controlled manner or be controlled in some other way at regular intervals.

For this purpose, a test vehicle 150 is autonomously controlled on route 135, and monitoring takes place as to whether the control satisfies predefined criteria. It may specifically be checked whether a desired, scheduled or optimal course is ensured. In one specific embodiment, the course may be predefined together with predefined tolerance limits, and a departure from the tolerance limits may cause the drive of test vehicle 150 along route 135 to be determined as unsuccessful. Test vehicle 150 is able to travel routes 135 existing in parking lot 105 to exhaustion. In this context, parking and unparking processes into and out of a parking space 110 at an end of route 135 may or may not be included. In a different specific embodiment, only a few predefined routes 135 in parking lot 105 are driven. These routes 135 may be selected at random, for instance. Routes 135 may also be selected in such a way that all traffic areas 125 in parking lot 105 are covered. Each route 135 may be traveled once or multiple times. If two different routes 135 exist between a parking space 110 and parking area 120, then they may be counted as individual routes 135.

To monitor a test drive on route 135, test vehicle 150 is preferably equipped with additional sensors that are able to record the quality of the executed drives and/or document the driving process. In one specific embodiment, a processing device is also provided on board test vehicle 150 in order to determine not only whether or not the test drive is successful on the basis of the scanned data, but also to determine a type of possible interference. As an alternative, this processing may also be carried out on the part of control device 135. To do so usually requires test vehicle 150 to transmit data about the course of the test drive to control device 135. Within the framework of the evaluation, it is specifically possible to determine whether the test drive was unsuccessful because a change has occurred on the part of parking system 100 or parking lot 105, or because a change has occurred on the part of test vehicle 150.

A change on the part of test vehicle 150, for example, may include an updated version of a control program of a control system that is used for the autonomous guidance of test vehicle 150 on route 135. This control system may encompass a longitudinal or transverse control of test vehicle 150, in particular.

In order to obtain clearances for a plurality of different vehicle types of motor vehicles 115, if possible, route 135 may be driven by different test vehicles 150. In one specific embodiment, test vehicle 150 is developed to emulate a plurality of different vehicle types by specifically operating one or a plurality of control device(s) on board test vehicle 150 using corresponding control programs. Preferably, test vehicle 150 is able to activate multiple combinations of different versions of control programs of a vehicle type, so that the particular vehicle type is able to be tested to the fullest in all updating versions. In one further specific embodiment, test vehicle 150 is designed to operate a plurality of versions of control programs in parallel in order to check different updating versions of the vehicle type simultaneously.

A result of the travel of route 135 may be provided immediately (online) or within the framework of a subsequent data processing operation (offline). Combined processing either immediately and after the execution of the test drives may be realized as well. Different tests are analyzed for this purpose, for example, or only a rough check of the functionality takes place initially and a detailed analysis of additional operating parameters is carried out at a later time. In one particularly preferred specific embodiment, the type of problem that prevents a clearance of motor vehicle 115 of a corresponding vehicle type for parking system 100 is determined on the basis of the raw data and/or the processed data. In a still further specific embodiment, an item of information as to how the situation could be remedied or reduced in its severity is able to be determined.

What is claimed is:

1. A verification method for a parking system that includes a parking lot, the method comprising:
    autonomously travelling the route by a test vehicle in the parking lot, wherein the parking lot includes a plurality of parking spaces for parking motor vehicles, in which a motor vehicle in the parking system is autonomously controllable on a route between a parking area and one of the parking spaces;
    determining that the travel of the route is carried out correctly by the testing vehicle; and
    clearing the parking system for use by vehicles that correspond to the vehicle type of the test vehicle;
    wherein the test vehicle is configured to emulate a plurality of different vehicle types by specifically operating at least one control device on board the test vehicle using corresponding control programs for each of the vehicle types, and
    wherein the test vehicle is configured to activate multiple combinations of different versions of control programs of a vehicle type, so that the particular vehicle type is able to be tested in all updating versions, and/or is configured operate a plurality of versions of the control programs in parallel to check different updating versions of the vehicle type simultaneously.

2. The method as recited in claim 1, wherein multiple routes, between the parking area and a parking space in each case, are driven by the test vehicle.

3. The method as recited in claim 2, wherein a representative sample of routes from among a set of possible routes between all parking spaces and the parking area is driven by the test vehicle.

4. The method as recited in claim 1, wherein a sufficient number of routes between parking spaces and the parking area are driven by the test vehicle until all traffic areas of the parking lot have been driven.

5. The method as recited in claim 1, wherein the travel includes a parking or an unparking operation in a parking space.

6. The method as recited in claim 1, wherein a location of the parking lot at which the travel of the route does not take place correctly is determined.

7. The method as recited in claim 1, wherein the route is driven by a plurality of different test vehicles.

8. The method as recited in claim 7, wherein two test vehicles of the plurality of different test vehicles include one or more control system(s) in each case and differ only in versions of control programs of the control systems.

9. The method as recited in claim 1, wherein an evaluation of the travel by the test vehicle is carried out after the test drive has been concluded.

10. A non-transitory computer readable data carrier on which is stored a computer program, which is executable by a processor, comprising:
    a program code arrangement having program code for operating a parking system that includes a parking lot, by performing the following:
        autonomously travelling the route by a test vehicle in the parking lot, wherein the parking lot includes a plurality of parking spaces for parking motor vehicles, in which a motor vehicle in the parking system is able to be autonomously controlled on a route between a parking area and one of the parking spaces;
        determining that the travel of the route is carried out correctly; and
        clearing the parking system for use by vehicles that correspond to the vehicle type of the test vehicle;
        wherein the test vehicle is configured to emulate a plurality of different vehicle types by specifically operating at least one control device on board the test vehicle using corresponding control programs for each of the vehicle types, and
        wherein the test vehicle is configured to activate multiple combinations of different versions of control programs of a vehicle type, so that the particular vehicle type is able to be tested in all updating versions, and/or is configured operate a plurality of versions of the control programs in parallel to check different updating versions of the vehicle type simultaneously.

11. A test vehicle for a parking system that includes a parking lot, comprising:
    a testing vehicle configured to perform the following:
        autonomously travelling a route in the parking lot, wherein the parking lot includes a plurality of parking spaces for parking motor vehicles, in which a motor vehicle in the parking system is autonomously controllable on a route between a parking area and one of the parking spaces;
        determining that the travel of the route is carried out correctly by the testing vehicle; and
        clearing the parking system for use by vehicles that correspond to the vehicle type of the testing vehicle;
        wherein the testing vehicle is configured to travel the route using different versions of control programs, and
        wherein the testing vehicle is configured to emulate a plurality of different vehicle types by specifically operating at least one control device on board the testing vehicle using corresponding control programs for each of the vehicle types, and wherein the test vehicle is configured to activate multiple combinations of different versions of control programs of a vehicle type, so that the particular vehicle type is able to be tested in all updating versions, and/or is configured operate a plurality of versions of the control programs in parallel to check different updating versions of the vehicle type simultaneously.

* * * * *